(12) United States Patent
Edvardsson et al.

(10) Patent No.: US 10,578,478 B2
(45) Date of Patent: Mar. 3, 2020

(54) GUIDED WAVE RADAR LEVEL GAUGE SYSTEM WITH GROUNDED PROBE

(71) Applicant: Rosemount Tank Radar AB, Mölnlycke (SE)

(72) Inventors: Olov Edvardsson, Linköping (SE); Håkan Fredriksson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 413 days.

(21) Appl. No.: 15/481,783

(22) Filed: Apr. 7, 2017

(65) Prior Publication Data
US 2018/0292252 A1    Oct. 11, 2018

(51) Int. Cl.
| | | |
|---|---|---|
| G01F 23/292 | (2006.01) | |
| G01F 23/284 | (2006.01) | |
| G01S 13/88 | (2006.01) | |
| G01S 13/34 | (2006.01) | |
| G01S 13/10 | (2006.01) | |
| G01S 7/00 | (2006.01) | |
| G01S 13/32 | (2006.01) | |
| G01S 7/02 | (2006.01) | |

(52) U.S. Cl.
CPC ........ *G01F 23/2928* (2013.01); *G01F 23/284* (2013.01); *G01S 7/003* (2013.01); *G01S 13/10* (2013.01); *G01S 13/32* (2013.01); *G01S 13/34* (2013.01); *G01S 13/88* (2013.01); *G01S 2007/027* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0046573 | A1* | 3/2004 | Schroth | G01F 23/284 324/644 |
| 2009/0085794 | A1 | 4/2009 | Edvardsson et al. | |
| 2009/0303106 | A1* | 12/2009 | Edvardsson | G01F 23/284 342/124 |

(Continued)

OTHER PUBLICATIONS

Notification of Transmittal of the International Search Report and the Written Opinion of the International Searching Authority from PCT/EP2018/056126, dated Sep. 13, 2018.

*Primary Examiner* — Mamadou L Diallo
(74) *Attorney, Agent, or Firm* — Westman, Champlin & Koehler, P.A.

(57) ABSTRACT

A radar level gauge system comprising a transceiver; a probe for guiding a transmit signal towards a product in a tank, and for returning a surface echo signal; processing circuitry for determining the filling level based on the transmit signal and the surface echo signal; and a connection arrangement for conductively connecting the probe to the tank, and for providing the transmit signal from the transceiver to the probe. The connection arrangement comprises a feed-through member to which the probe is conductively connected. The feed-through member is in conductive contact with the tank at a grounding position, and a signal conductor extends through the feed-through member from the outside of the tank to the inside of the tank. A tank coupling arrangement is arranged on the inside of the tank to electrically connect the signal conductor and the metallic portion of the tank.

30 Claims, 8 Drawing Sheets

(56) References Cited

U.S. PATENT DOCUMENTS

| | | | | |
|---|---|---|---|---|
| 2011/0221629 A1* | 9/2011 | Edvardsson | .......... | G01F 23/284 |
| | | | | 342/124 |
| 2013/0314275 A1* | 11/2013 | Fredriksson | .......... | G01F 23/284 |
| | | | | 342/124 |
| 2015/0276461 A1* | 10/2015 | Guzman | ............... | G01F 23/284 |
| | | | | 73/290 V |
| 2015/0377680 A1* | 12/2015 | Edvardsson | ........... | H01Q 1/225 |
| | | | | 73/290 V |

* cited by examiner

GUIDED WAVE RADAR LEVEL GAUGE SYSTEM WITH GROUNDED PROBE

TECHNICAL FIELD OF THE INVENTION

The present invention relates to a guided wave radar level gauge system and to a method of installing a radar level gauge system at a tank.

TECHNICAL BACKGROUND

Radar level gauge systems are in wide use for measuring process variables of products, such as filling level, temperature, pressure etc. Radar level gauging is generally performed either by means of non-contact measurement, whereby electromagnetic signals are radiated towards a product in a tank, or by means of contact measurement, often referred to as guided wave radar (GWR), whereby electromagnetic signals are guided towards and into the product by a probe acting as a waveguide. The probe is generally arranged vertically from the top of the tank towards the bottom of the tank. The electromagnetic signals are reflected at the surface of the product, and the reflected signals are received by a receiver or transceiver comprised in the radar level gauge system. Based on the transmitted and reflected signals, the distance to the surface of the product can be determined. From this distance, the "ullage", the filling level of the product in the tank can be determined.

In case of GWR systems, forces, mainly due to friction between the probe and the product in the tank, which act on the probe and on the mechanical connection between the probe and the tank, most commonly the tank ceiling, may be very high. For example, in the case of solids, such as powders or granules, the probe may be subjected to a pulling force well in excess of 40 kN.

As a consequence, the mechanical connection between the probe and the tank should be designed to be able to withstand such high forces. Furthermore, an electrical connection between transceiver circuitry of the radar level gauge, which is typically arranged outside the tank, and the probe should be designed with signal propagation performance in mind, such as signal attenuation and/or impedance matching.

The design of a probe coupling device, which provides for electrical coupling between the transceiver circuitry and the probe is essential in achieving the above-mentioned signal propagation performance.

In general, a rather elaborate design of the probe coupling device is needed in order to simultaneously fulfill these mechanical and electrical requirements.

Additionally, the probe may unintentionally act as an antenna, picking up signals which may interfere with measurement circuitry connected to the probe if not properly taken care of.

In an attempt to address the above issues, US 2004/0046573 discloses a guided wave radar (GWR) level gauging system in which the probe is in metallic connection with a wall of the tank, such that the tensile forces on the waveguide are absorbed by metallic parts, and interfering signals are dissipated by the conductive bulk of the tank walls.

SUMMARY OF THE INVENTION

In view of the above, a general object of the present invention is to provide an improved radar level gauge system.

According to a first aspect of the present invention, it is therefore provided a radar level gauge system, for determining a filling level of a product in a tank, said radar level gauge system comprising:

a transceiver arranged on a first side of a tank seal separating an inside of the tank from an outside of the tank for generating, transmitting and receiving electromagnetic signals; a probe electrically coupled to the transceiver and comprising a probe conductor arranged on a second side of the tank seal and configured to guide an electromagnetic transmit signal from the transceiver towards and into the product in the tank, and to return an electromagnetic surface echo signal resulting from reflection of the transmit signal at a surface of the product back towards the transceiver; and processing circuitry for determining the filling level based on the transmit signal and the surface echo signal, wherein the probe further comprises: an electrically conductive feed-through member extending from a first end on the first side of the tank seal to a second end on the second side of the tank seal, the probe conductor being mechanically and electrically conductively connected to the feed-through member and extending towards the product from the feed-through member, the feed-through member being electrically coupled to a metallic portion of the tank at a grounding position spaced apart from the second end of the feed-through member; a signal conductor extending through the feed-through member from the first side of the tank seal to the second side of the tank seal, the signal conductor being electrically coupled to the transceiver on the first side of the tank seal; a dielectric sealing member sealingly arranged between the signal conductor and the feed-through member to provide the tank seal and to prevent conductive contact between the signal conductor and the feed-through member; and a tank coupling arrangement arranged on the second side of the tank seal to non-conductively electrically connect the signal conductor and the metallic portion of the tank.

The tank may be any container or vessel capable of containing a product, and may be metallic, or partly or completely non-metallic, open, semi-open, or closed.

In the context of the present application, the "probe conductor" is a waveguide designed for guiding electromagnetic signals. The probe conductor may be rigid or flexible and may advantageously be made of metal, such as stainless steel. The probe conductor may extend in a probe conductor direction, which may be substantially vertical.

The probe conductor may be mechanically and electrically connected to the feed-through member in various ways. For instance, the probe conductor may be screwed into the feed-through member, or the probe conductor may be welded to the feed-through member, or pressed into a hole formed in the feed-through member etc. Alternatively, the feed-through member and the probe conductor may be different portions of an integral part, which may, for example be formed using machining techniques, including turning and/or milling.

The "transceiver" may be one functional unit capable of transmitting and receiving electromagnetic signals, or may be a system comprising separate transmitter and receiver units.

The feed-through member may be electrically conductively connected to the metallic portion of the tank at the grounding position.

By "conductively connecting" should be understood a direct electrical connection, allowing a net transport of charge. Another term that is sometimes used is "galvanically connecting".

The "metallic portion" of the tank may, in principle, be any portion of the tank when the tank is metallic. Non-metallic tanks, such as plastic tanks, will typically have at least one (grounded) metallic portion on the tank roof. In open tanks, there will generally be an electrically conducting holding structure for holding the radar level gauge system, and defining an electrical ground of a tank.

The above-mentioned metallic portion of the tank is anticipated to often be a tubular mounting structure, generally referred to as a "nozzle", extending vertically from the tank roof.

In such cases, the electrically conductive feed-through member comprised in the probe may advantageously be in electrically conductive contact with the tubular mounting structure via a metallic lid. For instance, the feed-through member may be conductively (and sealingly) attached to the lid by means of, for example, bolting, screwing or welding, and the lid may be in turn be conductively (and sealingly) attached to the tubular mounting structure of the tank.

Further, the conductive feed-through member may advantageously extend substantially vertically from the first end of the feed-through member to the second end of the feed-through member, so that the feed-through member extends inside the tubular mounting structure along a portion of the tubular mounting structure.

In embodiments where the feed-through member is conductively attached to a metallic lid, the grounding position may be the conductive connection between the feed-through member and the lid, that is closest to the second end of the feed-through member.

However, the metallic portion of the tank need not necessarily be an integral portion of the tank, but may be a metallic part attached to a metallic portion of the tank. For instance, the metallic portion of the tank may be provided in the form of a tubular member (such as a piece of metal pipe) that is attached to the tank, for example to a tubular mounting structure of the tank, in connection with installation of the radar level gauge system. In embodiments of the present invention, such a tubular member may be comprised in the radar level gauge system.

As will be readily understood by one of ordinary skill in the art, the signal conductor, the feed-through member, and the dielectric arranged between the signal conductor and the feed-through member will form a coaxial line between the outside of the tank and the inside of the tank.

In embodiments of the present invention a relatively broad-band signal coupling to a probe that is grounded through conductive connection to the tank (a metallic portion of the tank) at a grounding position can be achieved by passing the transmit signal along a signal conductor through a feed-through member, and coupling the transmit signal to the tank (the metallic portion of the tank) inside the tank and spaced apart from the grounding position.

In embodiments of the present invention, this relatively broad-band coupling can be achieved without requiring any modification or non-standard specification of the tank at which the radar level gauge should be installed. In particular, there is no need for a signal coupling structure entering a tubular mounting structure (nozzle) from the side of the tubular mounting structure. To allow entry of a signal coupling structure from the side of a nozzle, it would be necessary to make a hole in the nozzle, at the tank, of the correct dimension and in the correct location. This may be difficult and would make installation of a radar level gauge system complicated, time-consuming and expensive.

According to various embodiments, the probe may be further configured to provide inductive and capacitive coupling in parallel between the probe conductor and the metallic portion of the tank, which may provide for a further improvement of the bandwidth of the non-conductive coupling of the electromagnetic signals between the transceiver and the probe conductor.

Advantageously, the transmit signal may have a center frequency; and the inductive and capacitive coupling in parallel may exhibit resonance for the center frequency. This configuration will contribute to an improved bandwidth of the non-conductive coupling of the transmit signal from the transceiver to the probe conductor, and of the surface echo signal from the probe conductor to the transceiver.

To provide the desired parallel resonant circuit, the grounding position may advantageously be spaced apart from the second end of the feed-through member by an electrical distance at least approximately corresponding to an uneven multiple of a quarter of a wavelength of the transmit signal at the center frequency.

According to embodiments of the present invention, the above-mentioned center frequency may be in the range of 0.5 GHz to 3 GHz.

For instance, the radar level gauge system may be of the so-called FMCW (frequency modulated continuous wave) type, and the frequency of the transmit signal be varied between, say, 1 GHz and 2 GHz. Of course, other frequency ranges may be possible, and to accommodate for such other frequency ranges, the connection arrangement may be configured to provide resonance at the center frequency of such frequency ranges. This is well within the reach of one of ordinary skill in the art. Alternatively, the radar level gauge system may be a so-called pulsed radar level gauge system.

In embodiments where the radar level gauge system is of the FMCW-type, the transmit signal may be modulated to exhibit a time-varying frequency; the transceiver may comprise a mixer for mixing the transmit signal and the surface echo signal to form an intermediate frequency signal; and the processing circuitry may be configured to determine the filling level based on the intermediate frequency signal.

Furthermore, the transmit signal may be a frequency modulated signal having a center frequency; and the inductive and capacitive coupling in series of the tank coupling arrangement may exhibit resonance for the center frequency.

Configuring the tank coupling arrangement to provide a series resonant circuit will contribute to an improved bandwidth of the non-conductive coupling of the transmit signal from the transceiver to the probe conductor, and of the surface echo signal from the probe conductor to the transceiver.

In particular in embodiments where the probe is configured to provide a parallel resonant circuit at least when installed at the tank, and a series resonant circuit in combination, the series resonant circuit balances the parallel resonant circuit and provides for an increased bandwidth.

By properly dimensioning, in particular, the tank coupling arrangement, it has been found that a uniform signal coupling can be achieved across a relatively large bandwidth. As an illustrative example, simulations show that a ±1% amplitude variation can be achieved across a frequency band from 0.85 GHz to 2.15 GHz.

To achieve a reasonably good signal coupling across a sufficient bandwidth (such as a bandwidth that is good enough for an FMCW-type radar level gauge system, or for a pulsed radar level gauge system with a reduced relative bandwidth), it has been found that the inductive and capacitive coupling in series may advantageously exhibit an inductance in the range of 0.1 nH to 10 nH, and a capacitance in the range of 0.1 pF to 10 pF.

In various embodiments, the tank coupling arrangement may comprise at least one laterally extending electrically conductive coupling member electrically connected to the signal conductor on the inside of the tank.

This coupling member may advantageously be substantially horizontally arranged.

Furthermore, the coupling member may advantageously be spaced apart from the grounding position by an electrical distance at least approximately corresponding to a quarter of a wavelength of the transmit signal at the center frequency, such as within ±20% of the electrical distance corresponding to a quarter of the wavelength at the center frequency.

According to embodiments, the coupling member may be arranged and configured to form a parallel plate capacitor together with the metallic portion of the tank. For instance, such a parallel plate capacitor may comprise an inner wall of a tubular mounting structure (which may be comprised in the tank or in the radar level gauge system), a dielectric material, and a substantially vertically extending metallic portion of the coupling member of the tank coupling arrangement. The dielectric of the parallel plate-type capacitor may, for example, be air/the tank atmosphere, or a solid dielectric material sandwiched between the metallic portion of the tank and the coupling member.

Furthermore, the signal conductor may at least extend from the first end of the feed-through member to the second end of the feed-through member.

Moreover, the probe conductor may advantageously be a single line probe conductor, and function as a so-called surface waveguide. The single line probe conductor may, for example, be provided as a wire, a rod, or a tube.

According to embodiments, the single line probe conductor may be tubular at least in a probe conductor portion extending through the feed-through member from the first end of the feed-through member to the second end of the feed-through member. This will allow insertion of additional sensors into the probe conductor, which will in turn provide for measurement of additional process variables of the product, substantially without influencing the ability of the probe conductor to guide electromagnetic signals.

Additional process variables (in addition to the filling level) of a product contained in a tank include, for example, temperature, pressure, flow, optical transmittance, acidity, water content, electrical conductivity etc. It should be noted that the values of these additional process parameters may typically be position dependent.

By measuring the value(s) of one or several such additional process variables, the accuracy of the filling level measurement can be improved.

Furthermore, an additional process variable may give valuable information about the product in addition to the filling level, such as the quality and/or purity of the product in question.

To facilitate manufacturing of the probe of the radar level gauge system, an area of a lateral (typically horizontal) cross-section of the feed-through member, at the second end of the feed-through member, may be greater than an area of a lateral (typically horizontal) cross-section of the single line probe conductor at the second end of the feed-through member.

According to a second aspect of the present invention, it is provided a radar level gauge system to be attached to an electrically conducting holding structure defining an electrical ground of a tank, for determining a filling level of a product in the tank, the radar level gauge system comprising: a transceiver for generating, transmitting and receiving electromagnetic signals; a probe connected to the transceiver and configured to guide an electromagnetic transmit signal from the transceiver towards and into the product in the tank, and to return an electromagnetic surface echo signal resulting from reflection of the transmit signal at a surface of the product back towards the transceiver; and processing circuitry for determining the filling level based on the transmit signal and the surface echo signal, wherein the probe comprises: an elongated electrically conducting first probe conductor portion extending in a probe direction towards and into the product; an electrically conducting second probe conductor portion arranged between the transceiver and the first probe conductor portion, the second probe conductor portion being conductively connected to the first probe conductor portion and to the holding structure, to thereby conductively connect the first probe conductor portion to the electrical ground of the tank; a signal conductor connected to the transceiver and extending through the second probe conductor portion in the probe direction for non-conductively feeding the transmit signal from the transceiver to the first probe conductor portion; and a dielectric member sealingly arranged between the signal conductor and the second probe conductor portion to electrically insulate the signal conductor from the second probe conductor portion.

According to embodiments, the signal conductor may protrude from the second probe conductor portion and comprises a signal conductor portion extending along the probe conductor portion.

The probe may further comprise a coupling arrangement conductively connected to the signal conductor portion, and configured to provide inductive and capacitive coupling in series between the signal conductor and the holding portion.

The coupling arrangement may comprise a laterally extending electrically conductive coupling member electrically connected to the signal conductor portion.

According to embodiments, the second probe conductor portion may be elongated and extend in the probe direction from the transceiver towards the product.

An area of a lateral cross-section of the second probe conductor portion may be greater than an area of a lateral cross-section of the first probe conductor portion.

Further embodiments of, and effects obtained through this second aspect of the present invention are largely analogous to those described above for the first aspect of the invention.

According to a third aspect of the present invention, it is provided a method of installing a radar level gauge system at a tank having a metallic tubular mounting structure, the method comprising the steps of: providing a radar level gauge system comprising: an electrically conductive feed-through member having a first end and a second end; a probe conductively connected to the feed-through member and extending from the second end of the feed-through member; a signal conductor extending through the feed-through member from the first end of the feed-through member to the second end of the feed-through member; a dielectric arranged between the signal conductor and the feed-through member to prevent conductive contact between the signal conductor and the feed-through member; and a tank coupling arrangement connected to the signal conductor at the second end of the feed-through member and configured to non-conductively electrically couple the signal conductor to the tubular mounting structure when the radar level gauge system is installed at the tank; arranging the radar level gauge system in relation to the tubular mounting structure in such a way that the tank coupling arrangement is positioned to non-conductively couple the signal conductor to the tubular mounting structure; and sealingly attaching the radar level gauge system to the tubular mounting structure in such a way that the feed-through member becomes conductively connected to the tubular mounting structure.

Advantageously, the tank coupling arrangement may be configured to provide inductive and capacitive coupling in series between the signal conductor and the tubular mounting structure when the radar level gauge system is installed at the tank, the radar level gauge system may be arranged in relation to the tubular mounting structure in such a way that the tank coupling arrangement is positioned to provide the inductive and capacitive coupling in series between the signal conductor and the tubular mounting structure.

According to embodiments, the method may further comprise the steps of providing a conductive lid being sealingly attachable to the tubular mounting structure, the lid having a through-hole for accommodating the feed-through member, wherein the step of sealingly attaching the radar level gauge system to the tubular mounting structure comprises the steps of: attaching and conductively connecting the feed-through member to the through-hole; and attaching and conductively connecting the lid to the tubular mounting structure.

In these embodiments, the radar level gauge system may be adapted for different dimensions of the tubular mounting structure (and thus to different tanks) through a suitable selection of the lid.

The lid may advantageously be configured to provide for the desired arrangement of the tank coupling arrangement inside the tubular mounting structure. According to embodiments, this may achieved by providing a lid in which the through-hole is off-center in the lid for positioning the coupling arrangement in relation to an inner wall of the tubular mounting structure.

Further embodiments of, and effects obtained through this third aspect of the present invention are largely analogous to those described above for the first and second aspects of the invention.

In summary, the present invention thus relates to a radar level gauge system comprising a transceiver; a probe for guiding a transmit signal towards a product in a tank, and for returning a surface echo signal; processing circuitry for determining the filling level based on the transmit signal and the surface echo signal; and a connection arrangement for conductively connecting the probe to the tank, and for providing the transmit signal from the transceiver to the probe. The connection arrangement comprises a feed-through member to which the probe is conductively connected. The feed-through member is in conductive contact with the tank at a grounding position, and a signal conductor extends through the feed-through member from the outside of the tank to the inside of the tank. A tank coupling arrangement is arranged on the inside of the tank to electrically connect the signal conductor and the metallic portion of the tank.

BRIEF DESCRIPTION OF THE DRAWINGS

These and other aspects of the present invention will now be described in more detail, with reference to the appended drawings showing example embodiments of the invention, wherein.

DETAILED DESCRIPTION OF AN EXAMPLE EMBODIMENT OF THE INVENTION

In the present detailed description, various embodiments of the present invention are mainly discussed with reference to an FMCW-type radar level gauge system.

It should be noted that this by no means limits the scope of the present invention, which also covers a pulsed radar level gauge system using electromagnetic signals in a suitable frequency range.

Figure 1:
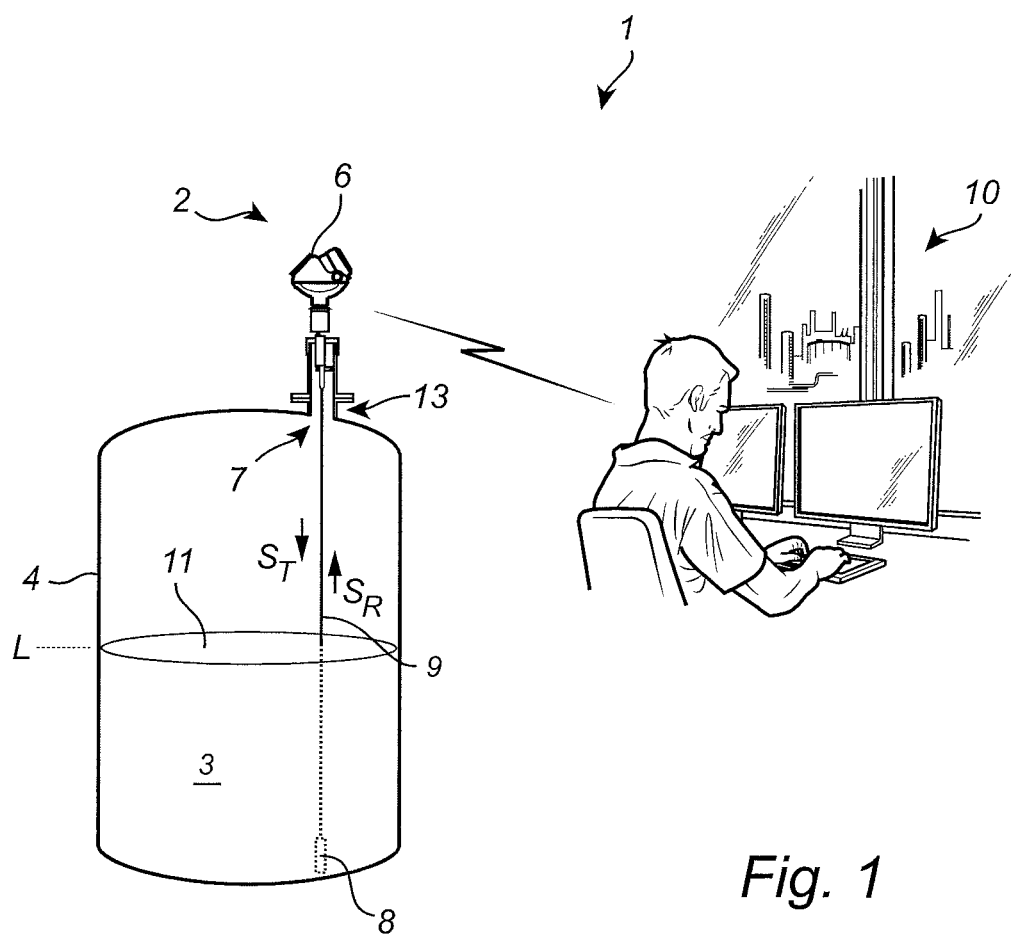
FIG. 1 schematically illustrates an exemplary tank arrangement comprising a radar level gauge system according to an embodiment of the present invention.

FIG. 1 schematically shows a level measuring system 1 comprising a radar level gauge system 2 according to an example embodiment of the present invention, and a host system 10 illustrated as a control room.

The radar level gauge system 2 of GWR (Guided Wave Radar) type is installed at a tank 4 having a tubular mounting structure 13 (often referred to as a "nozzle") extending substantially vertically from the roof of the tank 4.

The radar level gauge system 2 is installed to measure the filling level of a product 3 in the tank 4. The radar level gauge system 2 comprises a measuring unit 6 and a propagation device in the form of probe 7 extending from the measuring unit 6, through the tubular mounting structure 13, towards and into the product 3. In the example embodiment in FIG. 1, the probe 7 comprises a probe conductor 9 in the form of a wire probe, that has a weight 8 attached at the end thereof to keep the wire straight and vertical. The probe conductor 9 is grounded through conductive electric connection to a metallic structure, here the tubular mounting structure 13, of the tank 4, and the probe 7 is configured for non-conductive transmission of electromagnetic signals between the measurement unit 6 and the probe conductor 9. Configurations of the probe 7 will be described in greater detail further below.

By analyzing transmitted signals $S_T$ being guided by the probe 7 towards the surface 11 of the product 3, and reflected signals $S_R$ traveling back from the surface 11, the measurement unit 6 can determine the filling level of the product 3 in the tank 4. It should be noted that, although a tank 4 containing a single product 3 is discussed herein, the distance to any material interface along the probe can be measured in a similar manner.

The radar level gauge system in FIG. 1 will now be described in more detail with reference to the schematic block diagram in FIG. 2.

Using the radar level gauge system according to various embodiments of the present invention, the time-of-flight is determined based on the phase difference between the phase-modulated transmit signal and the surface reflection signal. This type of measurement scheme is often generally referred to as FMCW (Frequency Modulated Continuous Wave).

Figure 2:
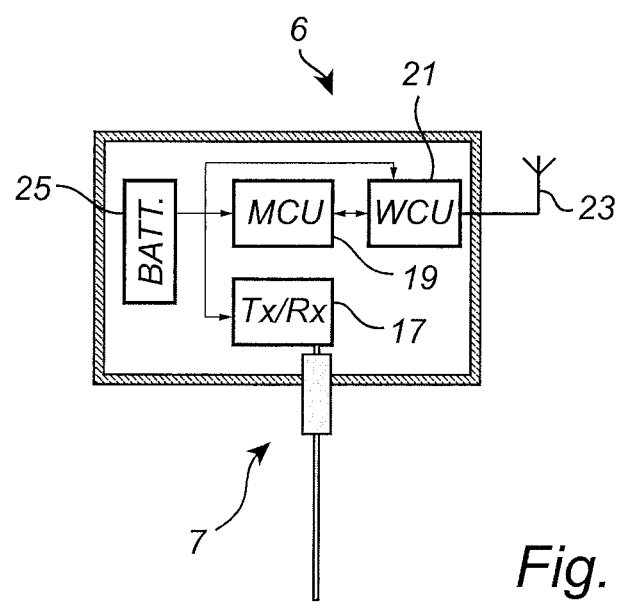
FIG. 2 is schematic illustration of the measurement unit comprised in the radar level gauge system in FIG. 1.

Referring to the schematic block diagram in FIG. 2, the measurement unit 6 of the radar level gauge system 2 in FIG. 1 comprises a transceiver 17, a measurement control unit (MCU) 19, a wireless communication control unit (WCU) 21, a communication antenna 23, and an energy store, such as a battery 25.

As is schematically illustrated in FIG. 2, the MCU 19 controls the transceiver 17 to generate, transmit and receive electromagnetic signals. The transmitted signals pass to the probe 7, and the received signals pass from the probe 7 to the transceiver 17.

The MCU 19 determines the filling level of the product 3 in the tank 4 based on the phase difference between the transmit signal $S_T$ and the reflected signal $S_R$. The filling level is provided to an external device, such as a control center from the MCU 19 via the WCU 21 through the communication antenna 23. The radar level gauge system 1 may advantageously be configured according to the so-called WirelessHART communication protocol (IEC 62591).

Although the measurement unit 6 is shown to comprise an energy store 25 and to comprise devices (such as the WCU 21 and the communication antenna 23) for allowing wireless communication, it should be understood that power supply and communication may be provided in a different way, such as through communication lines (for example 4-20 mA lines).

The local energy store need not only comprise a battery, but may alternatively, or in combination, comprise a capacitor or super-capacitor.

The radar level gauge system 2 in FIG. 1 will now be described in greater detail with reference to the schematic block diagram in FIG. 3.

Figure 3:
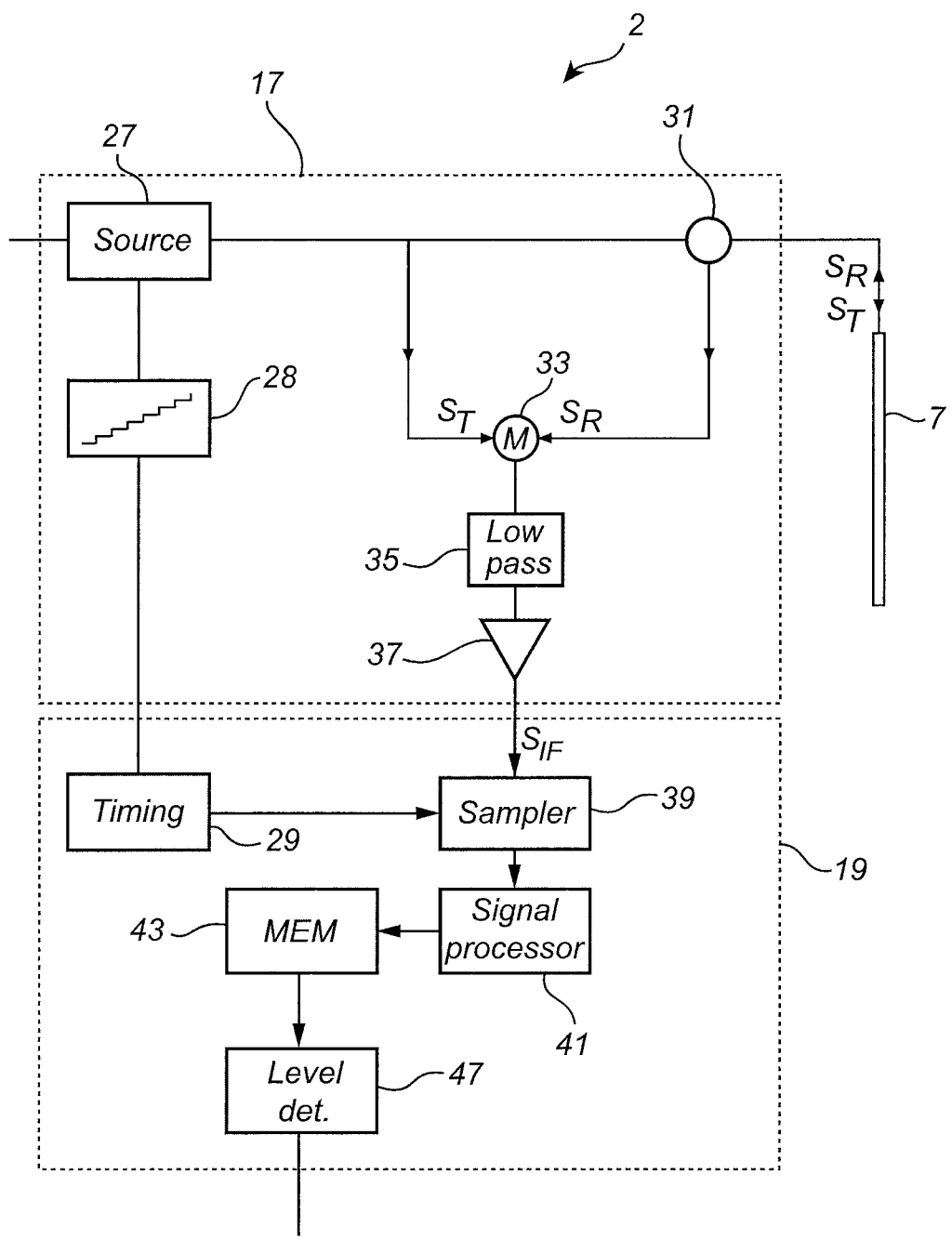
FIG. 3 is a schematic block diagram of a radar level gauge system according to an embodiment of the present invention.

Referring now to FIG. 3, there is shown a more detailed block diagram of the transceiver 17 and MCU 19 in FIG. 2.

The transceiver 17 here includes a microwave source 27 driven by a step generator 28, in turn controlled by timing circuitry 29 forming part of the MCU 19. The microwave source 27 is connected to the probe 7 via a power divider 31. The power divider 31 is arranged to connect a return signal from the probe 7 to a mixer 33, which is also connected to receive the signal from the microwave source 27. The mixer output is connected to a low pass filter 35 and an amplifier 37.

The processing circuitry 19 here includes, in addition to the timing circuitry 29 mentioned above, a sampler 39 configured to receive and sample the intermediate frequency signal $S_{IF}$ output by the mixer 33, low pass filtered by the low pass filter 35 and amplified by the amplifier 37. The sampler 39 may, for example, comprise a sample-and-hold circuit in combination with an A/D-converter, or be realized as a sigma-delta converter. The sampler 39 is controlled by the timing circuitry to be synchronized with the transmit signal $S_T$. The MCU 19 further includes a signal processor 41, a memory 43, and a level determinator 47.

While the elements of the transceiver 17 are typically implemented in hardware, and form part of an integrated unit normally referred to as a microwave unit, at least some portions of the MCU 19 may typically be embodied by software modules executed by an embedded processor. The invention is not restricted to this particular realization, and any implementation found suitable to realize the herein described functionality may be contemplated.

Figure 4:
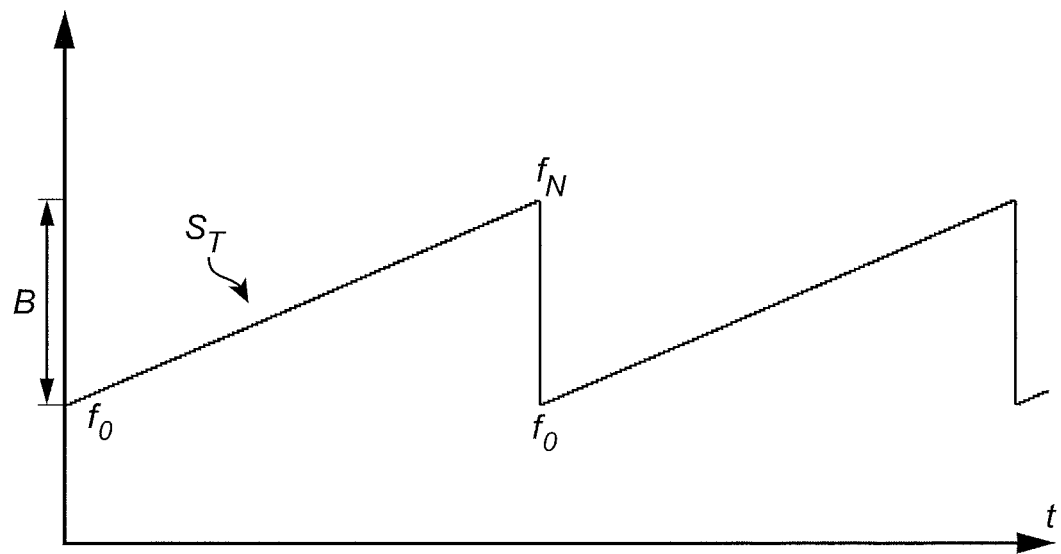
FIG. 4 schematically illustrates an example of a transmit signal transmitted by the transceiver in a radar level gauge system according to an embodiment of the invention.

With reference to FIG. 3, the timing circuitry 29 controls the microwave source 27 via the step generator 28 for form the transmit signal $S_T$. Referring to FIG. 4, the transmit signal $S_T$ is provided in the form of a time sequence $f_0$–$f_N$ of a number of discrete and mutually different frequencies $f_n$. As is schematically indicated in FIG. 4, the discrete and mutually different frequencies $f_0$–$f_N$ define a bandwidth B. In this particular example, the frequencies adjacent in terms of frequency are also adjacent in the time sequence, but this is not necessarily the case. Alternatively, the discrete and mutually different frequencies may be output in an arbitrary but known order.

The reflection signal $S_R$ results from reflection of the transmit signal $S_T$ at impedance discontinuities (including the surface 11 indicated in FIG. 1). Due to the time-of-flight from the radar level gauge system to the different impedance discontinuities and back, the reflection signal $S_R$ will be a delayed copy of the transmit signal $S_T$, where the portions of the reflection signal $S_R$ reflected from the different impedance discontinuities will exhibit different phase differences as compared to the transmit signal $S_T$. The phase differences will, furthermore, change in steps with the changes in transmitted discrete frequency $f_n$.

Figure 5:
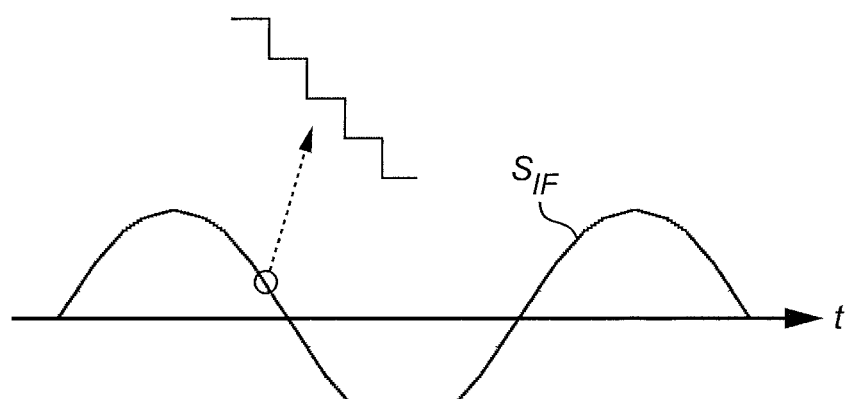
FIG. 5 is a diagram showing the intermediate frequency signal resulting from the transmit signal.

An intermediate frequency signal $S_{IF}$ is formed by combining the transmit signal $S_T$ and the reflection signal $S_R$ in the mixer 33. The intermediate frequency signal $S_T$ is schematically shown in FIG. 5.

If a transmit signal with a continuously varying frequency had been used, the intermediate frequency signal would have been a continuous signal comprising one frequency component for each time-of-flight corresponding to the different impedance discontinuities encountered by the transmit signal.

Since the transmit signal $S_T$ is instead a sequence of discrete frequencies $f_n$, the phase difference will vary in steps, which means that the intermediate frequency signal $S_{IF}$ will be piece-wise constant with the same duration of the constant portions as the duration of transmission of the different frequencies $f_n$ of the transmit signal $S_T$. This is schematically indicated in FIG. 5.

The intermediate frequency signal $S_{IF}$, which has been sampled by the sampler 39 in FIG. 3 is processed by the signal processor 41 in order to determine a data set indicative of surface echo candidates. The intermediate frequency signal $S_T$ in FIG. 5 is first transformed from the time domain to the frequency domain using, for example, FFT (Fast Fourier Transform). Following transformation to the frequency domain of the intermediate frequency signal $S_{IF}$, the resulting frequency spectrum is transformed to an echo curve, which is used by the level determinator 47 to determine the filling level of the product 3 in the tank 4.

A first example of the probe 7 comprised in the radar level gauge system 2 in FIG. 1 will now be described with reference to FIG. 6A. As is schematically shown in FIG. 6A, the probe 7 comprises, in addition to the probe conductor 9, an electrically conductive feed-through member 51, a signal conductor 53, a dielectric 55, and a tank coupling arrangement 56.

The feed-through member 51 extends from a first end 57 on an outside of the tank 4 to a second end 59 on an inside of the tank 4. The probe conductor 9 is conductively connected to the feed-through member 51, and extends towards the product in the tank 4 from the second end 59 of the feed-through member 51. In the example configuration of the probe 7 in FIG. 6A, the probe conductor 9 comprises an upper probe part 10a with a first probe diameter $D_a$, and a lower probe part 10b with a second probe diameter $D_b$. As is schematically indicated in FIG. 6A, the first probe diameter $D_a$ is greater than the second probe diameter $D_b$. The upper probe part 10a, which is here shown to be screwed into the feed-through member 51, acts as an impedance transformer to contribute to the bandwidth that is obtained by the probe 7.

The feed-through member 51 is in conductive contact with a conductive lid 61 at a grounding position 63. As is indicated in FIG. 6A, the grounding position 63 is spaced apart from the second end 59 of the feed-through member 51 by an electrical distance L substantially corresponding to a quarter of the wavelength of the transmit signal $S_T$ at a center frequency $f_c=(f_0+f_N)/2$ at the center of the frequency band B (referring to FIG. 4).

Figure 6A:
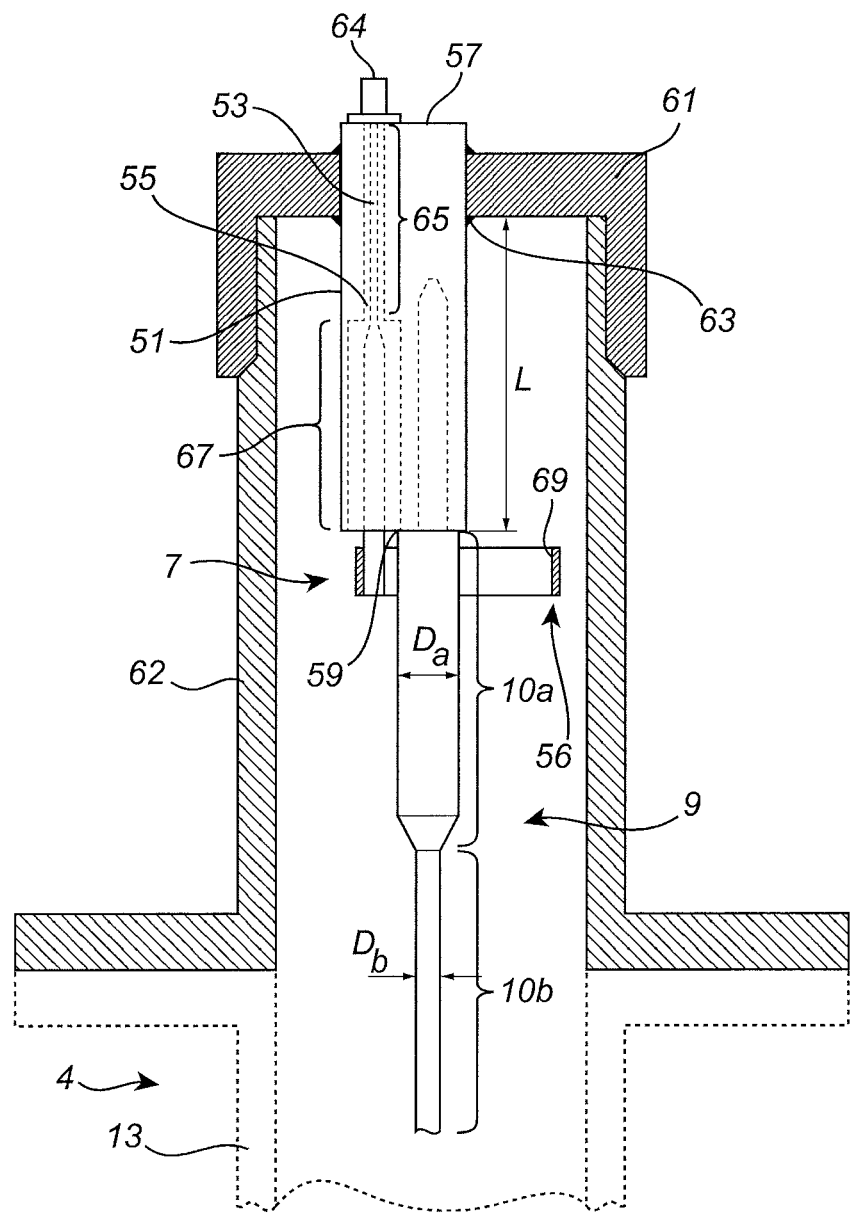
FIG. 6A schematically shows a first example configuration of the probe comprised in the radar level gauge system in FIG. 1.
Figure 6A:
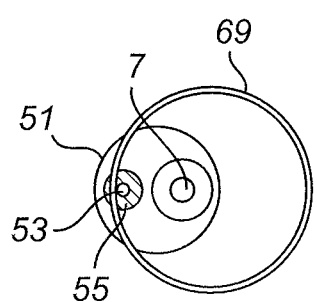

In the example configuration of the probe 7 shown in FIG. 6A, the feed-through member 51 is in conductive contact with the tubular mounting structure 13 via a welded connection between the feed-through member 51 and the lid 61, a threaded connection between the lid 61 and a tubular member 62 fixed to the tubular mounting structure (nozzle) 13 by bolts (not shown in FIG. 6A). It should be noted that this is only one exemplary way of achieving an electrically conductive contact between the feed-through member 51 and a conductive structure (here the tubular mounting structure 13) of the tank 4, and that there are many other ways of achieving the desired conductive contact.

The signal conductor 53 extends through the feed-through member 51 from the outside of the tank 4 to the inside of the tank 4. In the example configuration schematically shown in FIG. 6A, the signal conductor 53 is connected to a connector 64 at the outside of the tank 4. When the measurement unit 6 has been connected to the probe 7, the transceiver 17 will be connected to the connector 64 to provide the transmit signal $S_T$ to the signal conductor 53.

As is schematically indicated in FIG. 6A, the dielectric 55 is arranged between the signal conductor 53 and the feed-through member 51 to prevent conductive contact between the signal conductor 53 and the feed-through member 51. The signal conductor 53, the dielectric 55, and the feed-through member 51 together form a coaxial line having a first coaxial line portion 65 having a first thickness of the dielectric 55, and a second coaxial line portion 67 having a second, greater, thickness of the dielectric 55. The second coaxial line portion 67 acts as an impedance transformer contributing to the bandwidth of the probe 7.

The tank coupling arrangement 56 is connected to the signal conductor 53 on the inside of the tank, and is configured to provide inductive and capacitive coupling in series between the signal conductor 53 and the inner wall of the tubular member 62. In the example configuration of the connection arrangement in FIG. 6A, the tank coupling arrangement 56 comprises a radially extending electrically conductive coupling member, here provided in the form of a bent metal ribbon 69 encircling the upper probe portion 10a of the probe conductor 9. The ribbon 69 is arranged and configured to form a parallel plate capacitor together with the inner wall of the tubular member 62. In particular, the dimensions (vertical extension and radius of curvature) of the metal ribbon 69, and the distance between the metal ribbon 69 and the inner wall of the tubular member 62 are selected to achieve a desired capacitance of the capacitor formed by the ribbon 69, the tubular member 62, and the dielectric between the ribbon 69 and the tubular member 62. The desired capacitance may be in the range of 0.1 pF to 10 pF. It will be straight-forward for one of ordinary skill in the relevant art to dimension the coupling member (ribbon 69), and/or to position the coupling arrangement 15 in relation to the tubular member 62 to achieve a capacitance that is desired for a particular frequency range of the transmit signal $S_T$.

Figure 7:
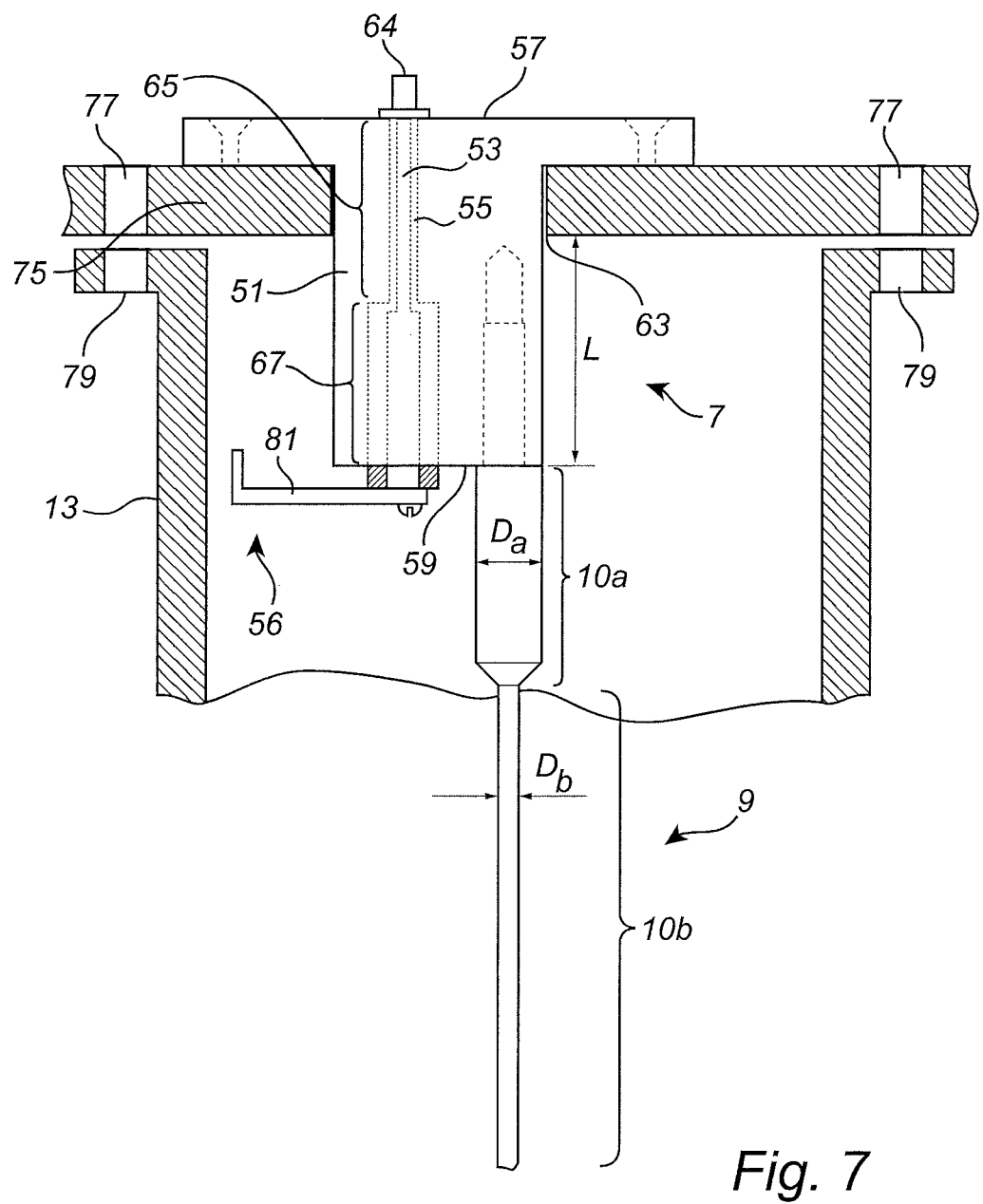
FIG. 7 schematically shows a second example configuration of the probe comprised in the radar level gauge system in FIG. 1.

In the example embodiment in FIG. 6A, the tubular member 62 is delivered as a part of the radar level gauge system 2. This allows the supplier of the radar level gauge system 2 to precisely control critical dimensions (in particular the distance between the ribbon 69 and the inner wall of the tubular member 62). It should be noted, however, that this distance, and other dimensions, can be set by the customer and/or controlled by the supplier in other ways. One such alternative way for the supplier of controlling the distance between the conductive coupling member and the metallic tank structure will be described below in connection with FIG. 7 schematically showing a second example configuration of the probe 7.

Figure 6B:
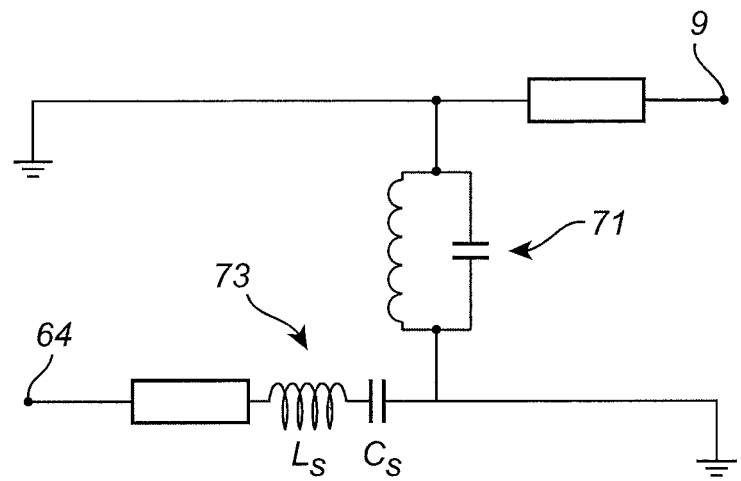
FIG. 6B is a schematic circuit diagram of the connection arrangement in FIG. 6A.

FIG. 6B is a simplified circuit schematic illustrating the electrical filter properties of the probe 7 in FIG. 6A. With the dimensions indicated in FIG. 6A and described above, the coaxial line formed by the tubular member 62 and the feed-through member 51 between the grounding position 63 and the second end 59 (which electrically corresponds to the uppermost portion of the probe conductor 9) forms a parallel resonant circuit 71. The tank coupling arrangement 56 forms, together with the tubular member 62, a series resonant circuit 73 with substantially the same resonance frequency as the parallel resonant circuit 71.

As is schematically indicated in FIG. 6B, the series resonant circuit 73 is characterized by a series inductance $L_s$ and a series capacitance $C_s$. Simulations give that the series inductance should preferably be in the range of 0.1 nH to 10 nH, and that the series capacitance should preferably be in the range of 0.1 pF to 10 pF.

Figure 6C:
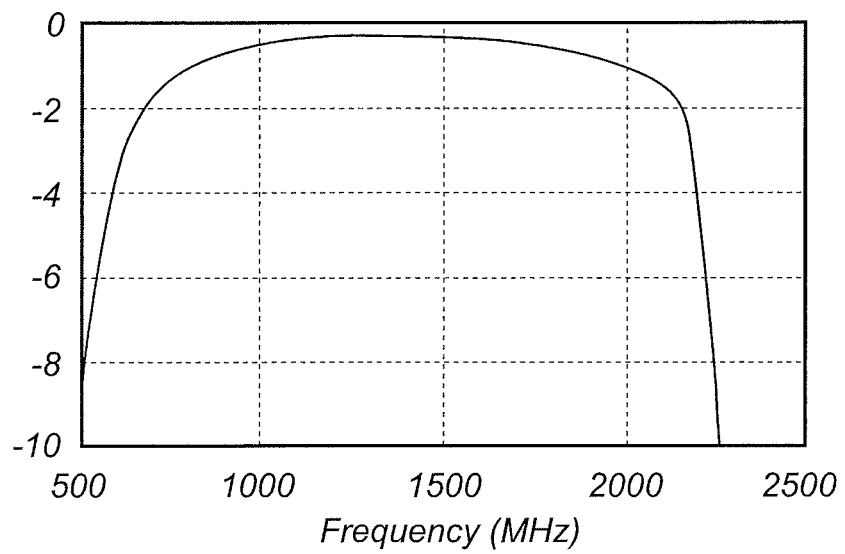
FIG. 6C is a graph schematically illustrating signal attenuation simulated for an example configuration of the connection arrangement comprised in the radar level gauge system according to embodiments of the invention as a function of frequency.

A simulation performed for dimensions such as those shown in FIG. 6A resulted in the signal transmission (from the connector 64 to the lower probe portion 10b of the probe conductor 9) in dB as a function of frequency is shown in FIG. 6C.

A second example configuration of the probe 7 in FIG. 1 will now be described with reference to FIG. 7. As is clear from a comparison of FIG. 6A and FIG. 7, the probe 7 in FIG. 7 functions according the the same principle as the probe 7 in FIG. 6A. The probe 7 in FIG. 7 mainly differs from that in FIG. 6A in that the feed-through member 51, and thus the probe conductor 9, is connected to a metallic structure of the tank 4 (the tubular mounting structure 13) in a different way, and in that the tank coupling arrangement 56 is configured differently.

In the connection arrangement configuration in FIG. 7, the feed-through member 51 is attached and conductively connected to a lid 75. The lid 75 is, as is schematically shown in FIG. 7, provided with mounting holes 77, to be aligned with corresponding mounting holes 79 in a flange on the tubular mounting structure 13, which is here an integral part of the tank 4. As is also indicated in FIG. 7, the position of the feed-through member 51 in the lid is off-center, to achieve a proper position of the tank coupling arrangement 56 when the lid 75 and the tank arrangement 15 are attached to the tank 4.

In the tank arrangement 15 in FIG. 7, the tank coupling arrangement comprises a radially extending electrically conductive coupling member in the form of a generally L-shaped piece of sheet metal 81, which is positioned in relation to the inner wall of the tubular mounting structure to achieve the desired electrical properties of the series resonant circuit 73 in FIG. 6B (for the probe 7 in FIG. 7).

Although only a single coupling member 81 has been shown in FIG. 7 (and in FIG. 6A), it should be understood, that the performance of the connection arrangement may be further improved by providing more than one coupling member. Such additional coupling members may, for example, be configured to suppress unwanted waveguide modes etc.

Since the dimensions of the tubular mounting structures 13 of different tanks are generally known, the relative positioning of the feed-through member 51 in relation to the fastening holes 77 in the lid 75 can be used to correctly position the coupling member 81 in relation to the inner wall of the tubular mounting structure 13.

A third example configuration of the probe 7 in FIG. 1 will now be described with reference to FIG. 8. As is schematically shown in FIG. 8, the probe 7 comprises an elongated electrically conducting first probe conductor portion 85, an electrically conducting second probe conductor portion 87, a signal conductor 53, and a dielectric member 55.

The first probe conductor portion 85 extends in a probe direction z towards and into the product in the tank. The second probe conductor portion 87 is arranged between the transceiver (not shown in FIG. 8) and the first probe conductor portion 85. The second probe conductor portion 87 is conductively (galvanically) connected to the first probe conductor portion 85, and to an electrically conducting holding structure (not shown in FIG. 8) defining an electrical ground of the tank.

The signal conductor 53 extends through the second probe conductor portion 87 in the above-mentioned probe direction z. In the example configuration schematically shown in FIG. 8, the signal conductor 53 is connected to a connector 64 at the outside of the tank. When the measurement unit 6 has been connected to the probe 7, the transceiver 17 will be connected to the connector 64 to provide the transmit signal $S_T$ to the signal conductor 53.

Figure 8:
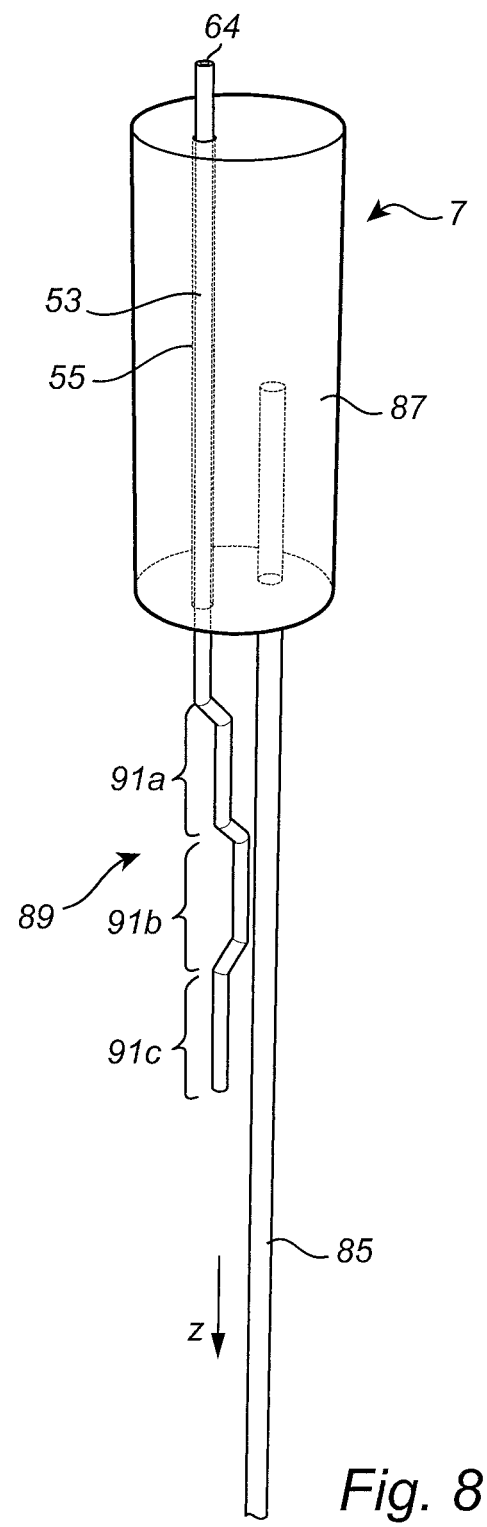
FIG. 8 schematically shows a third example configuration of the probe comprised in the radar level gauge system in FIG. 1.

As is schematically indicated in FIG. 8, the dielectric 55 is arranged between the signal conductor 53 and the second probe conductor portion 87 to electrically insulate the signal conductor 53 from the second probe conductor portion 87. The signal conductor 53, the dielectric 55, and the second probe conductor portion 87 together form a coaxial line.

In the example configuration in FIG. 8, the signal conductor 53 protrudes from the second probe conductor portion 87 and comprises a signal conductor portion 89 extending along the first probe conductor portion 85 for non-conductively coupling the transmit signal from the transceiver to the first probe conductor portion 85. In FIG. 8, the signal conductor portion 89 is schematically indicated as having first 91a, second 91b, and third 91c segments with different non-conductive coupling strengths to the first probe conductor portion 85. Various such coupling configurations are described in detail in US 2009/0085794, which is hereby incorporated by reference in its entirety. It should be noted that the exemplary signal conductor portion 89 in FIG. 8 forms a so-called directional coupler.

In alternative configurations, the probe 7 in FIG. 8 may comprise a tank coupling arrangement such as the tank coupling arrangement examples described above with reference to FIG. 6A and FIG. 7. In such configurations, referring to FIG. 6A and FIG. 7, the tank coupling arrangement 56 may be attached to the third 91c segment of the signal conductor portion 89 to provide inductive and capacitive coupling in series between the third 91c segment and the holding portion (not shown in FIG. 8).

Figure 9:
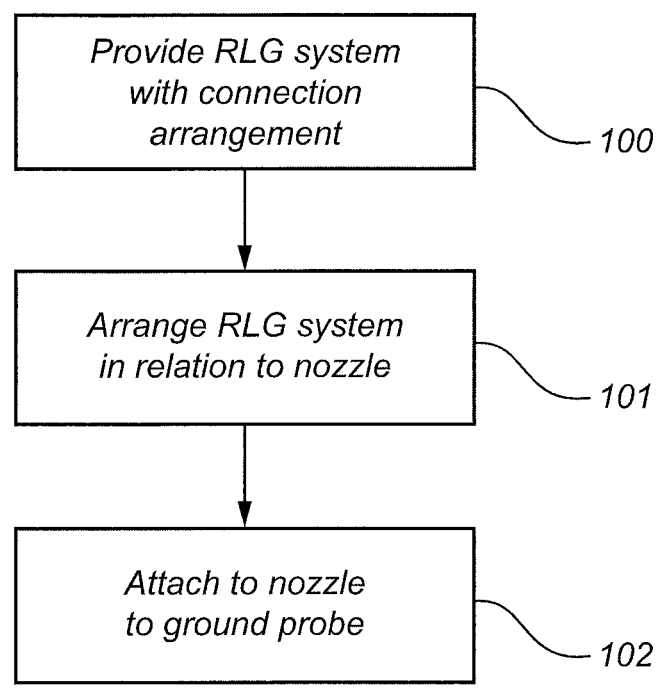
FIG. 9 is a flow-chart schematically illustrating an example embodiment of the method according to the present invention.

An example embodiment of the method according to the present invention will now be described with reference to the flow-chart in FIG. 9.

In a first step 100, a radar level gauge system 2 such as that described above is provided. The radar level gauge system 2 comprises a tank arrangement 15, having a tank coupling arrangement as described above.

In the next step 101, the radar level gauge system is arranged in relation to the tubular mounting structure of the tank in such a way that the tank coupling arrangement is positioned to provide an inductive and capacitive coupling in series between the signal conductor and said tubular mounting structure. Subsequently, in step 102, the radar level gauge system 2 is attached to the tubular mounting structure 13 in such a way that the feed-through member 51 becomes conductively connected to the tubular mounting structure 13.

The person skilled in the art realizes that the present invention by no means is limited to the preferred embodiments described above. For example, many other configurations of the probe 7 may be feasible. In particular, many other configurations of the tank coupling arrangement 56 and the connection of the feed-through member 51 to the tank 4 will be possible.

What is claimed is:

1. A radar level gauge system, for determining a filling level of a product in a tank, said radar level gauge system comprising:

a transceiver arranged on a first side of a tank seal separating an inside of said tank from an outside of said tank for generating, transmitting and receiving electromagnetic signals;

a probe electrically coupled to said transceiver and comprising a probe conductor arranged on a second side of said tank seal and configured to guide an electromagnetic transmit signal from said transceiver towards and into said product in the tank, and to return an electromagnetic surface echo signal resulting from reflection of said transmit signal at a surface of said product back towards said transceiver; and processing circuitry for determining said filling level based on said transmit signal and said surface echo signal, wherein said probe further comprises:

an electrically conductive feed-through member extending from a first end on the first side of said tank seal to a second end on the second side of said tank seal, said probe conductor being mechanically and electrically conductively connected to said feed-through member and extending towards said product from said feed-through member, said feed-through member being electrically coupled to a metallic portion of said tank at a grounding position spaced apart from the second end of said feed-through member;

a signal conductor extending through said feed-through member from the first side of said tank seal to the second side of said tank seal, said signal conductor being electrically coupled to said transceiver on the first side of said tank seal;
a dielectric sealing member sealingly arranged between said signal conductor and said feed-through member to provide said tank seal and to prevent conductive contact between said signal conductor and said feed-through member; and
a tank coupling arrangement arranged on the second side of said tank seal to non-conductively electrically connect said signal conductor and the metallic portion of said tank.

2. The radar level gauge system according to claim 1, wherein said tank coupling arrangement is conductively connected to said signal conductor on the second side of said tank seal, and configured to provide inductive and capacitive coupling in series between said signal conductor and the metallic portion of said tank.

3. The radar level gauge system according to claim 1, wherein said probe is further configured to provide inductive and capacitive coupling in parallel between said probe conductor and the metallic portion of said tank.

4. The radar level gauge system according to claim 3, wherein said transmit signal has a center frequency; and wherein said inductive and capacitive coupling in parallel exhibits resonance for said center frequency.

5. The radar level gauge system according to claim 4, wherein said grounding position is spaced apart from the second end of said feed-through member by an electrical distance substantially corresponding to a quarter of a wavelength of said transmit signal at the center frequency.

6. The radar level gauge system according to claim 4, wherein said center frequency is in the range of 0.5 GHz to 3 GHz.

7. The radar level gauge system according to claim 2, wherein said transmit signal has a center frequency; and wherein said inductive and capacitive coupling in series, provided by said tank coupling arrangement, exhibits resonance for said center frequency.

8. The radar level gauge system according to claim 7, wherein said center frequency is in the range of 0.5 GHz to 3 GHz.

9. The radar level gauge system according to claim 2, wherein said inductive and capacitive coupling in series, provided by said tank coupling arrangement, exhibits an inductance in the range of 0.1 nH to 10 nH, and a capacitance in the range of 0.1 pF to 10 pF.

10. The radar level gauge system according to claim 1, wherein said tank coupling arrangement comprises a laterally extending electrically conductive coupling member electrically connected to said signal conductor on the second side of said tank seal.

11. The radar level gauge system according to claim 10, wherein said coupling member is substantially horizontally arranged.

12. The radar level gauge system according to claim 10, wherein said coupling member is spaced apart from said grounding position by an electrical distance substantially corresponding to a quarter of a wavelength of said transmit signal at the center frequency.

13. The radar level gauge system according to claim 10, wherein said coupling member is arranged and configured to form a parallel plate capacitor together with the metallic portion of said tank.

14. The radar level gauge system according to claim 1, wherein said signal conductor extends from the first end of said feed-through member to the second end of said said feed-through member.

15. The radar level gauge system according to claim 1, wherein said probe conductor is a single line probe conductor.

16. The radar level gauge system, according to claim 15, wherein said single line probe conductor is tubular at least in a probe conductor portion extending through said feed-through member from the first end of said feed-through member to the second end of said feed-through member.

17. The radar level gauge system according to claim 15, wherein an area of a lateral cross-section of said feed-through member at the second end of said feed-through member is greater than an area of a lateral cross-section of said single line probe conductor at the second end of said feed-through member.

18. The radar level gauge system according to claim 15, wherein said single line probe conductor comprises an impedance matching portion extending from the second end of said feed-through member towards the product in said tank.

19. The radar level gauge system according to claim 1, wherein:
said transmit signal is modulated to exhibit a time-varying frequency;
said transceiver comprises a mixer for mixing said transmit signal and said surface echo signal to form an intermediate frequency signal; and
said processing circuitry is configured to determine said filling level based on said intermediate frequency signal.

20. The radar level gauge system according to claim 1, wherein said feed-through member is electrically conductively connected to said metallic portion of said tank at said grounding position.

21. A radar level gauge system to be attached to an electrically conducting holding structure defining an electrical ground of a tank, for determining a filling level of a product in said tank, said radar level gauge system comprising:
a transceiver for generating, transmitting and receiving electromagnetic signals;
a probe connected to said transceiver and configured to guide an electromagnetic transmit signal from said transceiver towards and into said product in the tank, and to return an electromagnetic surface echo signal resulting from reflection of said transmit signal at a surface of said product back towards said transceiver; and
processing circuitry for determining said filling level based on said transmit signal and said surface echo signal,
wherein said probe comprises:
an elongated electrically conducting first probe conductor portion extending in a probe direction towards and into said product;
an electrically conducting second probe conductor portion arranged between said transceiver and said first probe conductor portion, said second probe conductor portion being conductively connected to said first probe conductor portion and to said holding structure, to thereby conductively connect said first probe conductor portion to the electrical ground of said tank;
a signal conductor connected to said transceiver and extending through said second probe conductor portion in said probe direction for non-conductively feeding said transmit signal from the transceiver to the first probe conductor portion; and a dielectric member sealingly arranged between said signal conductor and said second probe conductor portion to electrically insulate said signal conductor from said second probe conductor portion.

22. The radar level gauge system according to claim 21, wherein said signal conductor protrudes from said second probe conductor portion and comprises a signal conductor portion extending along said first probe conductor portion.

23. The radar level gauge system according to claim 22, wherein said probe further comprises a coupling arrangement conductively connected to said signal conductor portion, and configured to provide inductive and capacitive coupling in series between said signal conductor and said holding portion.

24. The radar level gauge system according to claim 23, wherein said coupling arrangement comprises a laterally extending electrically conductive coupling member electrically connected to said signal conductor portion.

25. The radar level gauge system according to claim 21, wherein said second probe conductor portion is elongated and extends in said probe direction from said transceiver towards said product.

26. The radar level gauge system according to claim 25, wherein an area of a lateral cross-section of said second probe conductor portion is greater than an area of a lateral cross-section of said first probe conductor portion.

27. A method of installing a radar level gauge system at a tank having a metallic tubular mounting structure, said method comprising the steps of:

providing a radar level gauge system comprising:

an electrically conductive feed-through member having a first end and a second end;

a probe conductor conductively connected to said feed-through member and extending from said feed-through member;

a signal conductor extending through said feed-through member from the first end of said feed-through member to the second end of the feed-through member;

a dielectric arranged between said signal conductor and said feed-through member to prevent conductive contact between said signal conductor and said feed-through member; and a tank coupling arrangement connected to said signal conductor at the second end of said feed-through member and configured to non-conductively electrically couple said signal conductor to said tubular mounting structure when said radar level gauge system is installed at said tank;

arranging said radar level gauge system in relation to said tubular mounting structure in such a way that said tank coupling arrangement is positioned to non-conductively electrically couple said signal conductor to said tubular mounting structure; and attaching said radar level gauge system to said tubular mounting structure in such a way that said feed-through member becomes conductively connected to said tubular mounting structure.

28. The method according to claim 27, wherein said tank coupling arrangement is configured to provide inductive and capacitive coupling in series between said signal conductor and said tubular mounting structure when said radar level gauge system is installed at said tank, said radar level gauge system being arranged in relation to said tubular mounting structure in such a way that said tank coupling arrangement is positioned to provide said inductive and capacitive coupling in series between said signal conductor and said tubular mounting structure.

29. The method according to claim 27, further comprising the step of:

providing a conductive lid being attachable to said tubular mounting structure, said lid having a through-hole for accommodating said feed-through member, wherein said step of attaching said radar level gauge system to said tubular mounting structure comprises the steps of:

attaching said feed-through member to said through-hole; and attaching said lid to said tubular mounting structure.

30. The method according to claim 29, wherein said through-hole is off-center in said lid for positioning said coupling arrangement in relation to an inner wall of said tubular mounting structure.

* * * * *